No. 718,367. PATENTED JAN. 13, 1903.
W. M. MERRITT.
CULINARY VESSEL.
APPLICATION FILED JUNE 10, 1902.
NO MODEL.

Witnesses
F. A. Parron
L. R. Mullen

Inventor
Willard M. Merritt
by Milo B. Stevens & Co.
Attorneys

UNITED STATES PATENT OFFICE.

WILLARD M. MERRITT, OF LUDINGTON, MICHIGAN.

CULINARY VESSEL.

SPECIFICATION forming part of Letters Patent No. 718,367, dated January 13, 1903.

Application filed June 10, 1902. Serial No. 111,024. (No model.)

*To all whom it may concern:*

Be it known that I, WILLARD M. MERRITT, a citizen of the United States, residing at Ludington, in the county of Mason and State of Michigan, have invented certain new and useful Improvements in Culinary Vessels; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in culinary vessels for cooking potatoes and other articles of food which require that the water be drawn off after they are cooked. It has for its object to provide a vessel of this kind from which the water may be drawn without danger of scalding the hands of the operator.

A further object is to provide a vessel of this kind which shall be simple in construction and in its operation and also to provide means enabling the potatoes or other articles of food to be mashed or otherwise prepared therein.

To attain these objects, I provide a vessel having a perforated bottom and also a false bottom, which is also perforated, together with means to cover and uncover the perforations.

Novel details in the arrangement and construction of the several parts of my invention will be apparent from the detailed description hereinafter and the appended claims, when taken in connection with the accompanying drawings, in which—

Figure 1:
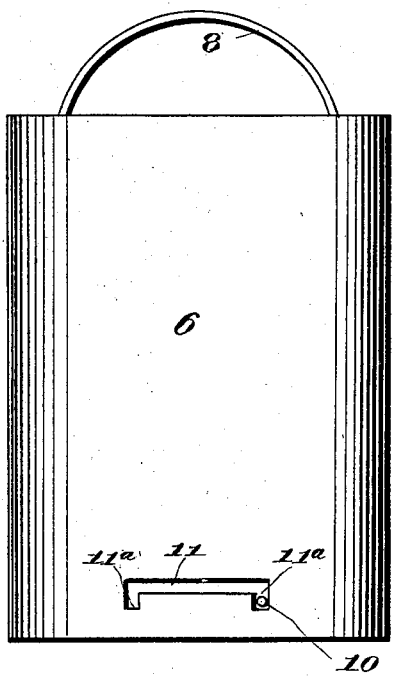
Figure 2:
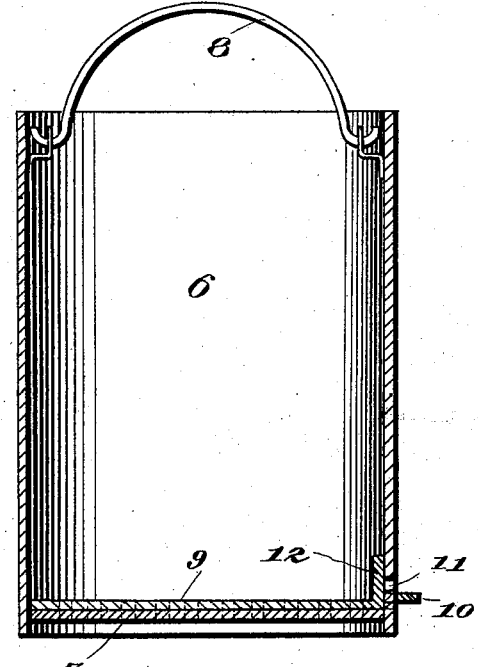
Figure 3:
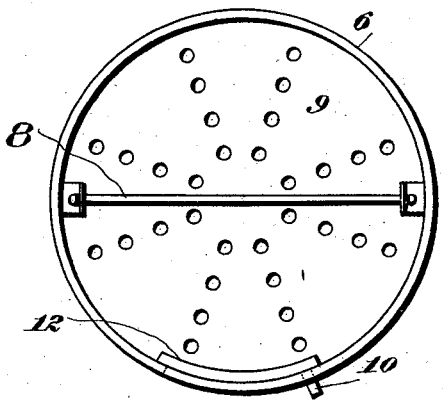
Figure 4:
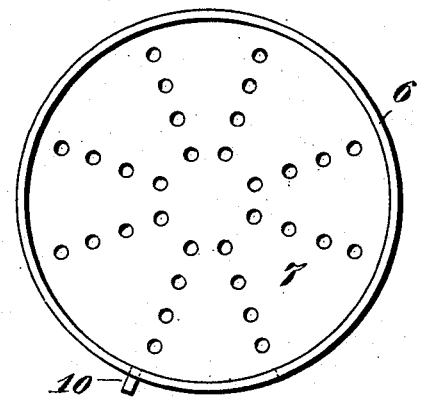

Figure 1 is a side elevation. Fig. 2 is a vertical section. Fig. 3 is a top plan, and Fig. 4 is a bottom plan.

Referring to the drawings, 6 designates a vessel having a perforated bottom 7. A bail 8 is secured to the vessel, preferably on the inside thereof. A false bottom, also perforated, is indicated at 9. This false bottom is so adjustable that the perforations therein may be made to register with the perforations in the bottom proper of the vessel, or they may be closed by said false bottom. I attain this result by shifting the false bottom on its axis by means of a small lever 10, attached thereto and projecting through a slot 11 in the side of the vessel, near the bottom thereof. The slot 11 has a recess 11ª at each end to retain the lever 10 in position. By shifting the lever from one of the recesses to the opposite recess the perforations are covered or uncovered. A shield 12, attached to the false bottom 9, covers the slot 11.

The operation of my invention is as follows: The potatoes or other articles to be cooked are placed in the vessel and the bottoms so adjusted that the perforations register with each other. The vessel is then placed in an ordinary kettle containing water and is rapidly filled by the water flowing through the perforations. When the article has cooked sufficiently and it is desired to draw off the water, the vessel is lifted out of the kettle, the water then draining off quickly through the perforations. When it is desired to mash the cooked article or otherwise prepare the same, the false bottom is shifted by means of the lever until the perforations in the bottom proper of the vessel are covered by the imperforate portion of the false bottom. The contents of the vessel then cannot escape, the slot through which the lever extends being also covered by the shield 12.

Having thus described my invention, what is claimed as new, and desired to be secured by Letters Patent, is—

1. The combination with a culinary vessel having a perforated bottom and provided with a transverse slot and longitudinal slots, said slots being situated slightly above the perforated bottom and said longitudinal slots extending toward said bottom from the ends of the transverse slot, of a perforated false bottom, and a lever secured thereto, said lever adapted to extend through said slots, the perforations in the bottom of the vessel being so arranged with respect to those of the false bottom that they may be carried into or out of register with the same, substantially as described.

2. The combination with a culinary vessel having perforations in its bottom and a slot in its side offset at the ends, of a perforated false bottom in the vessel, a lever secured thereto and extending outwardly through the slot, to shift the false bottom to carry its perforations into and out of register with the perforations in the bottom, and a shield secured to the false bottom covering the said slot, substantially as described.

In testimony whereof I affix my signature in presence of two witnesses.

WILLARD M. MERRITT.

Witnesses:
CHAS. MUNSON,
JOHN GAVAN.